United States Patent
Izuno et al.

(10) Patent No.: US 9,943,768 B2
(45) Date of Patent: Apr. 17, 2018

(54) RECORDING MEDIUM, INFORMATION PROCESSING SYSTEM, INFORMATION PROCESSING DEVICE AND INFORMATION PROCESSING METHOD

(71) Applicant: NINTENDO CO., LTD., Kyoto (JP)

(72) Inventors: Toshiharu Izuno, Kyoto (JP); Shinya Saito, Kyoto (JP); Kaori Miyachi, Kyoto (JP); Masahiro Shiotani, Kyoto (JP); Masahiro Sakurai, Tokyo (JP); Kenji Anabuki, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 303 days.

(21) Appl. No.: 14/701,966

(22) Filed: May 1, 2015

(65) Prior Publication Data

US 2016/0144284 A1 May 26, 2016

(30) Foreign Application Priority Data

Nov. 20, 2014 (JP) .................................. 2014-235793

(51) Int. Cl.
*A63F 9/24* (2006.01)
*A63F 13/00* (2014.01)
(Continued)

(52) U.S. Cl.
CPC .............. *A63F 13/95* (2014.09); *A63F 13/58* (2014.09); *A63F 13/825* (2014.09)

(58) Field of Classification Search
CPC ......... A63F 13/95; A63F 13/58; A63F 13/825
(Continued)

(56) References Cited

U.S. PATENT DOCUMENTS

| 6,290,565 B1 * | 9/2001 | Galyean, III | A63H 3/16 273/148 B |
|---|---|---|---|
| 9,403,085 B2 | 8/2016 | Eguchi et al. | |

(Continued)

FOREIGN PATENT DOCUMENTS

| GB | 2 365 796 | 2/2002 |
|---|---|---|
| JP | 2002-938 | 1/2002 |

(Continued)

OTHER PUBLICATIONS

Pokémon Scramble U, Nintendo Dream, vol. 230, Kabushiki Kaisha Ambit, Jun. 1, 2013, No. 18, $6^{th}$ Issue, vol. 230, p. 40-41 (5 pgs.) with partial translation.

No author, "E3, Experience the Evolution" Jun. 10-12, 2014 Los Angeles Convention Center, Jun. 10, 2014, http://2014.e3expo.com/ 2 pages.

(Continued)

*Primary Examiner* — Omkar Deodhar
*Assistant Examiner* — Wei Lee
(74) *Attorney, Agent, or Firm* — Nixon & Vanderhye P.C.

(57) ABSTRACT

An example system includes: a data acquisition unit for performing near field communication with a data storage medium having a near field communication function and acquiring character data stored in the data storage medium; an information processing unit for performing information processing to control a character corresponding to the character data, which has been acquired by the data acquisition unit, as a non player character; and a data changing unit for changing the character data depending on a processing result of the information processing unit.

18 Claims, 13 Drawing Sheets

(51) Int. Cl.

| G06F 17/00 | (2006.01) |
| G06F 19/00 | (2011.01) |
| A63F 13/95 | (2014.01) |
| A63F 13/825 | (2014.01) |
| A63F 13/58 | (2014.01) |

(58) Field of Classification Search
USPC .......................................................... 463/43
See application file for complete search history.

(56) References Cited

U.S. PATENT DOCUMENTS

| 2001/0005689 A1* | 6/2001 | Fujioka ................... A63F 13/12 |
| | | 463/4 |
| 2014/0031127 A1* | 1/2014 | Westerberg ....... H04M 1/72544 |
| | | 463/42 |
| 2014/0256430 A1 | 9/2014 | Matsumura |

FOREIGN PATENT DOCUMENTS

| JP | 2008-188137 | 8/2008 |
| JP | 2014-57776 | 4/2014 |
| JP | 2014-155545 A | 8/2014 |
| JP | 2014-171678 | 9/2014 |

OTHER PUBLICATIONS

No author, "Digital Event, Nintendo@E3", Jun. 10, 2014, http://e3nintendo.com, 2 pages.
No author, "lineup of the Wii U exhibited in E3 2014", Jun. 10, 2014, http://www.nintendo.co.jp/event/e3_2014/lineup/index.html 2 pages.
No author, "amiibo", published in E3 2014 on the homepage of the Nintendo Co., Ltd.., Jun. 10, 2014 http://www.nintendo.co.jp/event/e3_2014/lineup/amiibo/index.html, English version http://www.nintendo.com/amiibo/what-is-amiibo http://www.nintendo.com/amiibo/compatibility, 3 pages.
No author, "amiibo" http://www.nintendo.co.jp/amiibo/_index.html Oct. 7, 2014, English version http://www.nintendo.com/amiibo_http://www.nintendo.com/amiibo/what-is-amiibo 1 page.
No author,, http://www.smashbros.com/jp, Oct. 7, 2014, English version http://www.smashbros.com/us/ 3 pages.
No author, http://www.smashbros.com/jp/howto/entry8.html, Oct. 7, 2014, English Version http://www.smashbros.com/us/howto/entry8.html 4 pages.
No author, http://www.smashbros.com/jp/movielist/index.html, Oct. 7, 2014, English version http://www.smashbros.com/us/movielist/index.html 2pages.
No author, http://www.nintendo.co.jp/ir/library/events/141030/04.html Oct. 7, 2014, English version http://www.nintendo.co.jp/ir/en/library/events/141030/04.html 4 pages.

* cited by examiner

FIG. 4

CHARACTER DATA

| NAME | MOUSE |
|---|---|
| LEVEL | 4 |
| EXPERIENCE VALUE | 146 |
| PHYSICAL STRENGTH | 20 |
| OFFENSIVE POWER | 8 |
| DEFENSIVE POWER | 5 |
| SPEED | 7 |
| OWNED ITEM | HERB |
| AI CHARACTERISTIC VALUE | 6 |
| DEVICE ID | GA1033M |

RECORDING MEDIUM, INFORMATION PROCESSING SYSTEM, INFORMATION PROCESSING DEVICE AND INFORMATION PROCESSING METHOD

CROSS-REFERENCE TO RELATED APPLICATIONS

This application is based upon and claims the benefit of priority of the prior Japanese Patent Application No. 2014-235793, filed on Nov. 20, 2014, the entire contents of which are incorporated herein by reference.

FIELD

The present technology relates to a recording medium, an information processing system, an information processing device and an information processing method, which are configured to perform near field communication with a data storage medium and perform information processing on the basis of acquired data.

BACKGROUND AND SUMMARY

Near field communication technology such as NFC (Near Field Communication) or RFID (Radio Frequency IDentification) wherein wireless communication is performed contactlessly with an IC (Integrated Circuit) tag or the like has become widespread conventionally. In recent years, such a near field communication function is installed in some information processing devices such as game machines, portable telephones or smartphones.

According to an aspect of the embodiment, a recording medium has an information processing program recorded therein, the information processing program being capable of causing a computer to operate as: a data acquisition unit for performing near field communication with a data storage medium having a near field communication function and acquiring character data stored in the data storage medium; an information processing unit for performing information processing to control a character corresponding to the character data, which has been acquired by the data acquisition unit, as a non player character; and a data changing unit for changing the character data depending on a processing result of the information processing unit.

The object and advantages of the invention will be realized and attained by means of the elements and combinations particularly pointed out in the claims. It is to be understood that both the foregoing general description and the following detailed description are exemplary and explanatory and are not restrictive of the invention.

The above and further objects, features, aspects and effects of the present technique will more fully be apparent from the following detailed description through collation with the accompanying drawings.

BRIEF DESCRIPTION OF THE DRAWINGS

FIG. 4 shows an example non-limiting schematic diagram for illustrating an example of character data.

DETAILED DESCRIPTION OF NON-LIMITING EXAMPLE EMBODIMENTS

<System Outline>

Figure 1:
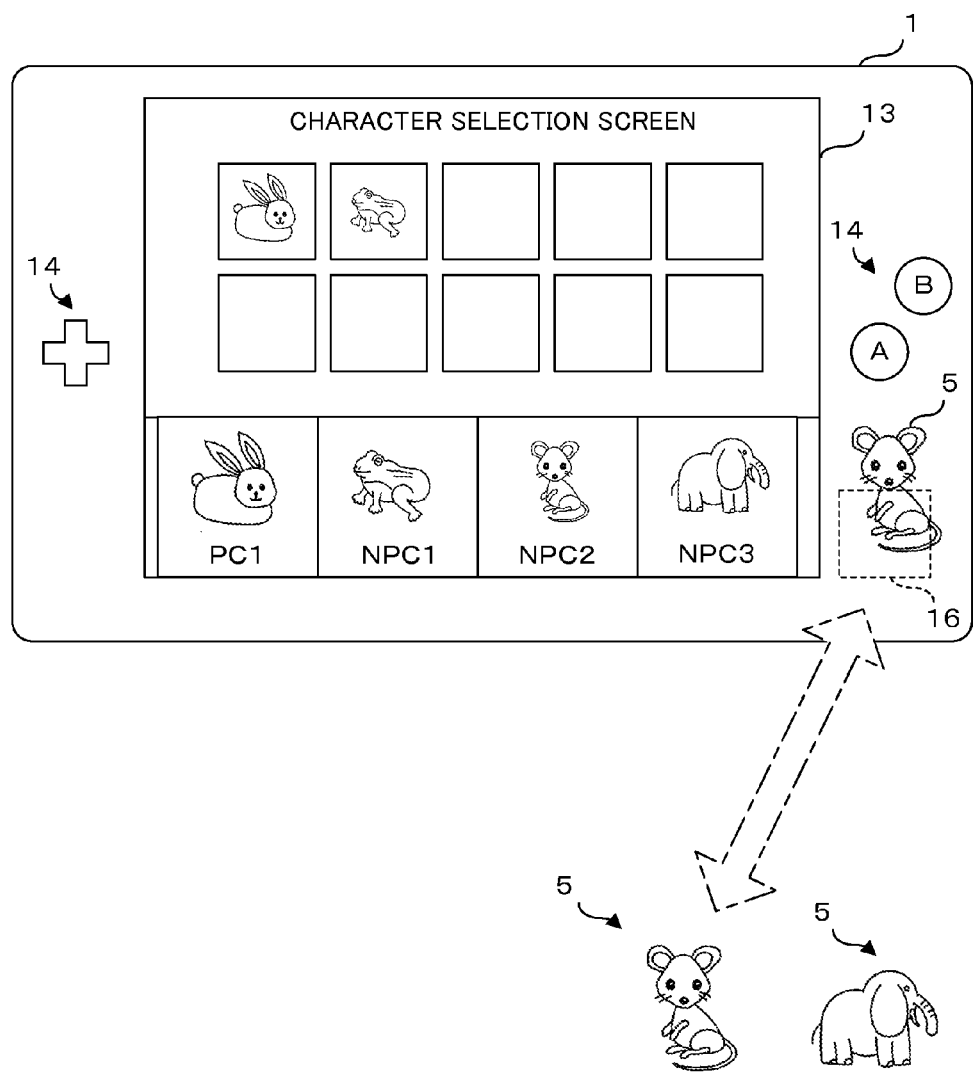
FIG. 1 shows an example non-limiting schematic diagram for explaining an outline of an information processing system according to this embodiment.

FIG. 1 shows an example non-limiting schematic diagram for explaining an outline of an information processing system according to this embodiment. The information processing system according to this embodiment is provided with a game device 1 and one or a plurality of FIG. 5. The game device 1 according to this embodiment is of portable type which the user can carry. The game device 1 is provided with a flat housing having an approximately parallelepiped shape. A display unit 13 is disposed at substantially the center of one face of the housing, and an operating unit 14 is disposed at both sides of the display unit 13. The operating unit 14 is constituted of, for example, a cross key, which is disposed on the left side of the display unit 13, and two push buttons, which are disposed on the right side of the display unit 13.

Figure 5:
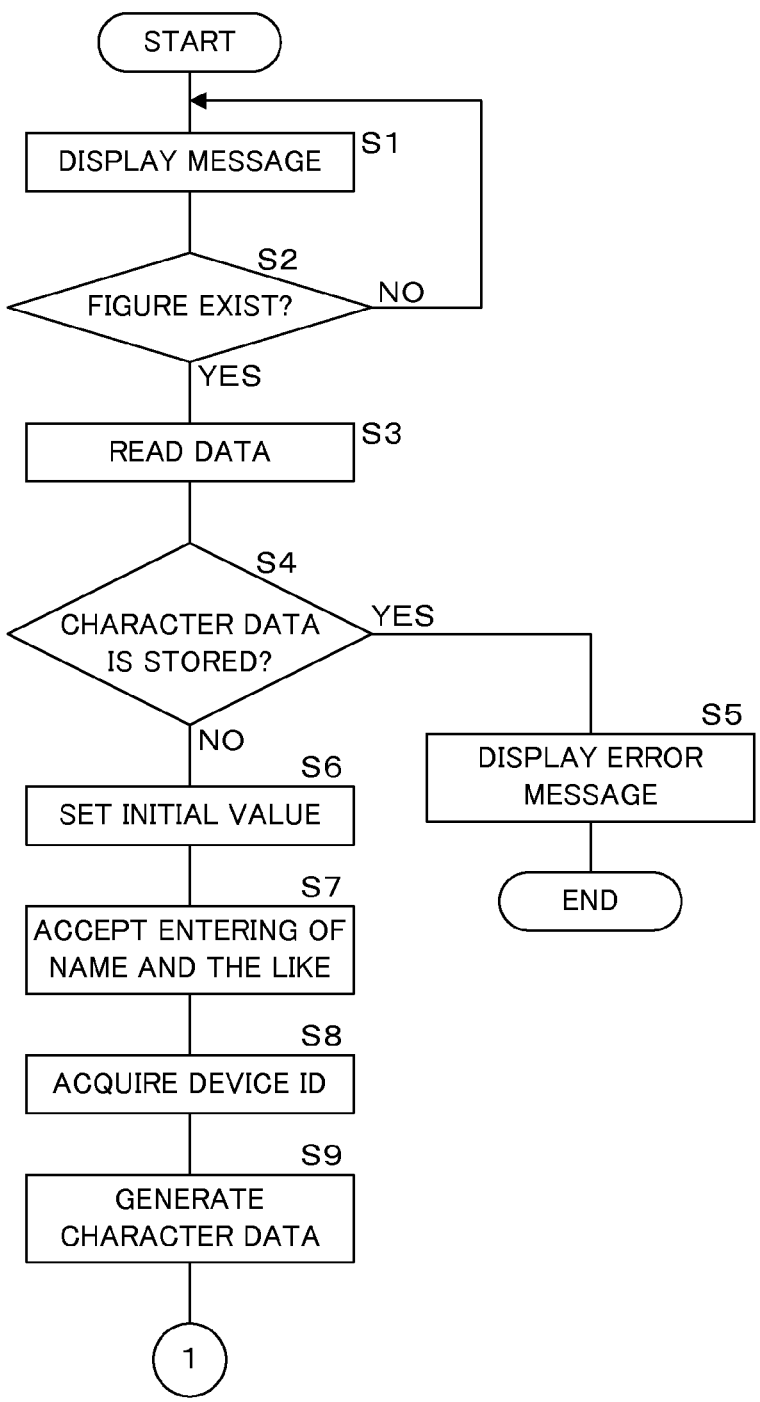
FIG. 5 shows an example non-limiting flowchart for illustrating the procedures of figure registration processing to be performed by a game device.

The game device 1 according to this embodiment is provided with a NFC (Near Field Communication) unit 16 for performing near field communication with a FIG. 5 which includes an IC tag. In this example, the NFC unit 16 is disposed on the right side of the display unit 13 and on the lower side of the push buttons of the operating unit 14. In FIG. 1, the NFC unit 16 is drawn as a rectangle with broken lines. When the user puts a FIG. 5 close to or into contact with such a position of the game device 1, the NFC unit 16 becomes able to communicate with the IC tag included in the FIG. 5.

The FIG. 5 according to this embodiment is a molded article made of synthetic resin, for example, and has an IC tag buried therein. The FIG. 5 is molded into a shape imitating a character which appears in a game to be realized with the game device 1 according to this embodiment. A plurality of types of FIG. 5 exist, and have different appearances depending on a plurality of characters which appear in a game. In the example illustrated in FIG. 1, a mouse FIG. 5 and an elephant FIG. 5 are used for a game.

A game according to this embodiment is a game wherein a plurality of (e.g., two to four) characters play a match. A character is not limited to a man but may be a living thing such as an animal, a plant, an insect, a fish or a bird, or a non-living thing such as a car, an airplane or a robot, for example. The user selects a player character (which will be hereinafter abbreviated as "PC"), which will be operated by the user himself, from a plurality of characters presented as choices in a character selection screen displayed at the display unit 13 of the game device 1. The user also selects a non player character (which will be hereinafter abbreviated as "NPC"), which will be an opponent in a game. In this embodiment, a PC is a character, the action of which such as movement and attacking is directly operated by the user using the operating unit 14 of the game device 1. When a plurality of users play a game, a plurality of PCs may exist. On the other hand, the user does not operate the action such as movement and attacking of an NPC, and the action such as movement and attacking of an NPC is controlled by a processor or the like of the game device 1. Which action of an NPC is to be performed is determined by a routine realized by a program executed by a processor, and the action such as movement and attacking of an NPC is performed automatically without requiring operation by the user.

Regarding the game device 1 according to this embodiment, it is possible to use the FIG. 5 for selection of an NPC. When the user puts the FIG. 5 close to the NFC unit 16 of the game device 1 while the character selection screen is being displayed, the game device 1 performs near field communication with the FIG. 5. The game device 1 puts a character based on data, which has been acquired from the FIG. 5, into a state selected as an NPC of an opponent. In the example illustrated in FIG. 1, a rabbit character is being selected as a PC and a frog character is being selected as a first NPC from a plurality of characters displayed as choices in the character selection screen. In the example illustrated in FIG. 1, a mouse character and an elephant character using FIG. 5 are being selected as a second NPC and a third NPC.

The game device 1 can communicate with another game device 1 through wireless communication or the like, so that a plurality of users can play a match. In such a case, a game can be played using all of four characters, for example, as PCs. For another example, two characters may be PCs and the other two characters may be NPCs. Furthermore, a game according to this embodiment can be played using all of four characters as NPCs. In such a case, the four NPCs may be based on FIG. 5, or may be selected from characters presented as choices in the character selection screen. When all characters are NPCs, the user is not required to perform operation after initiation of a game, and NPCs play a match under control of the game device 1.

After termination of a match in a game, an experience value, an item and the like corresponding to win-loss records are awarded to an NPC based on a FIG. 5. On the basis of the awarded experience value, item and the like, the user can change ability values such as offensive power and defensive power of the NPC. Data such as the awarded experience value, item and the like and the changed ability values can be saved by writing data in the FIG. 5. This allows the user to record growth of the NPC in the FIG. 5 and enjoy a match game using the NPC, which the user has grown, with another game device 1. The user can cause another game device 1, which is owned by another user such as his friend, for example, to read the data of the FIG. 5.

<System Configuration>

Figure 2:
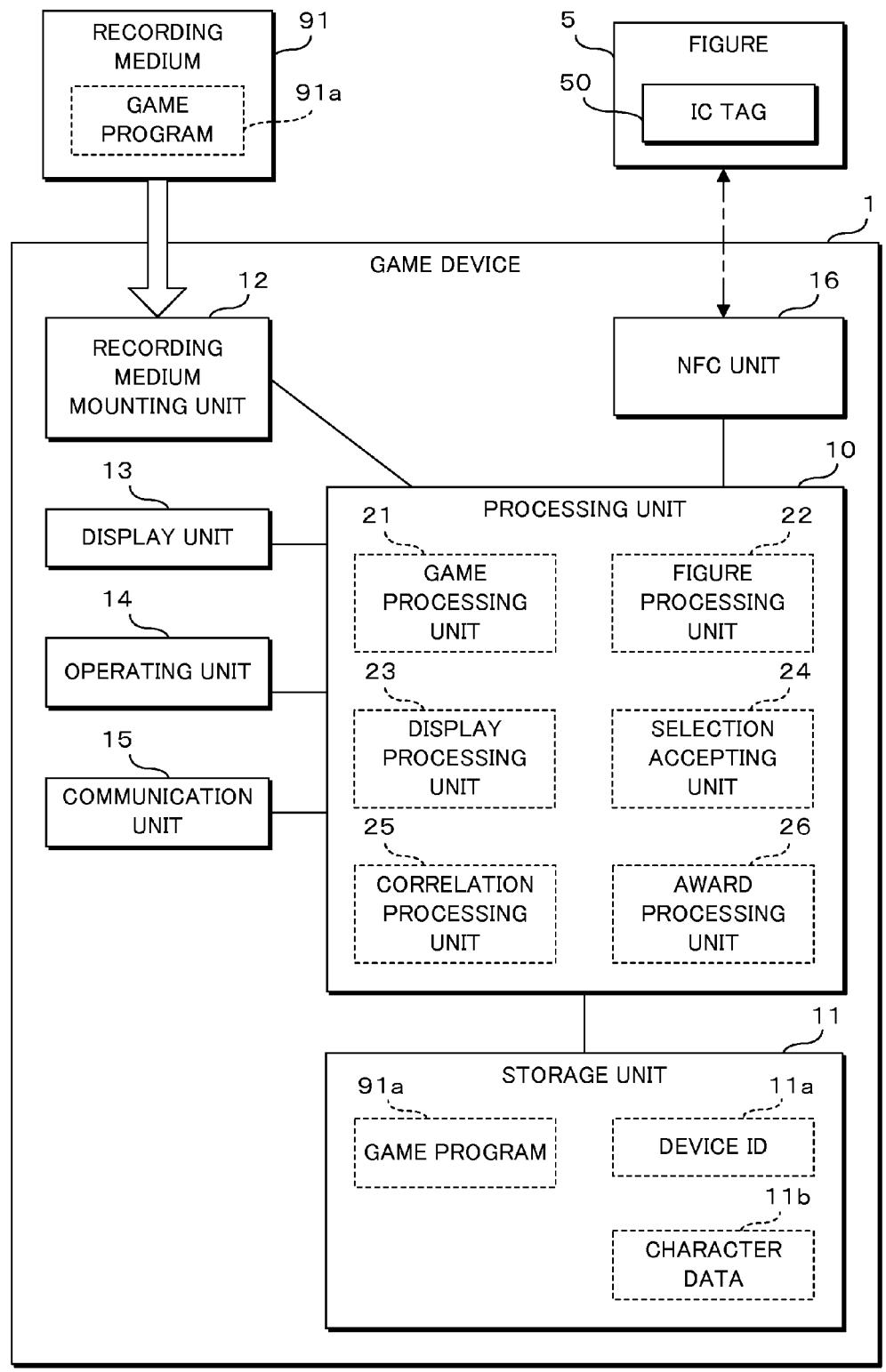
FIG. 2 shows an example non-limiting block diagram for illustrating the configuration of a game device.

FIG. 2 shows an example non-limiting block diagram for illustrating the configuration of the game device 1. The game device 1 according to this embodiment is provided with a processing unit (processor) 10, a storage unit 11, a recording medium mounting unit 12, the display unit 13, the operating unit 14, a communication unit 15, the NFC unit 16 and the like. The processing unit 10 of the game device 1 is constituted of an arithmetic processing device such as a CPU (Central Processing Unit). The processing unit 10 reads out and executes a game program 91*a* recorded in a recording medium 91 mounted on the recording medium mounting unit 12 or a game program 91*a* stored in the storage unit 11. This causes the processing unit 10 to perform various information processing related to a match game.

The storage unit 11 is constituted of a semiconductor memory element, a hard disk drive or the like. The storage unit 11 stores various programs such as the game program 91*a*, and data to be used for execution of the programs. In the storage unit 11, a device ID 11*a* which is uniquely attached to a game device 1 is stored. The device ID 11*a* may be stored not in the storage unit 11 but in another storage device such as an unillustrated ROM (Read Only Memory), for example. In the storage unit 11, character data 11*b* acquired from the FIG. 5 is temporally stored.

The recording medium mounting unit 12 is constructed to make it possible to attach and detach a recording medium 91 of card type, cassette type, disk type or the like. The processing unit 10 can read out the game program 91*a* and various data from the recording medium 91 mounted on the recording medium mounting unit 12. The recording medium mounting unit 12 may be constructed to allow the processing unit 10 to write a program, data or the like in the recording medium 91.

The display unit 13 is constituted of a liquid crystal panel or the like, and displays an image given from the processing unit 10. The operating unit 14 includes the cross key and push buttons illustrated in FIG. 1, and the like. The operating unit 14 may include a touch panel or the like disposed in the display unit 13. The operating unit 14 gives a signal corresponding to the content of operation performed by the user to the processing unit 10. The content of operation is pushing down, releasing or the like of a button, for example. The communication unit 15 transmits and receives information to and from another game machine 1, a server device or the like via the Internet, wireless LAN (Local Area Network) or the like, for example. The game machine 1 can communicate with a server device at the communication unit 15 so as to download the game program 91*a* or the like and store the game program 91*a* or the like in the storage unit 11, for example.

The NFC unit 16 transmits and receives data wirelessly and contactlessly to and from a FIG. 5, an IC card or the like according to a communication standard such as ISO/IEC18092 (so-called NFC), for example. The communication range of the NFC unit 16 typically is approximately several millimeters to several centimeters. The NFC unit 16 transmits a signal, which instructs reading out of stored data, to an IC tag 50 included in a FIG. 5, and receives required data in response thereto. The NFC unit 16 has a so-called IC tag reader function. The NFC unit 16 can transmit a signal, which instructs writing, together with write data so as to cause the IC tag 50 to write the data. That is, the NFC unit 16 has an IC tag writer function. Here, the communication method to be used by the NFC unit 16 is not limited to NFC but may be various communication modes, which are employed as contactless communication or short-range wireless communication or the like, such as RFID, for example.

Regarding the game device 1 according to this embodiment, the processing unit 10 executes the game program 91*a*, so that a game processing unit 21, a figure processing unit 22, a display processing unit 23, a selection accepting unit 24, a correlation processing unit 25, an award processing unit 26 and the like are realized by the processing unit 10 as software functional blocks. The game processing unit 21 performs various determination processing, event processing or the like involved in a game depending on operation or the like by the user accepted at the operating unit 14. The game processing unit 21 controls the action of the NPC or the like.

The figure processing unit 22 utilizes the NFC unit 16 to perform processing such as data acquisition from the FIG. 5 and data writing to the FIG. 5. The figure processing unit 22 performs processing to read out the character data 11b from the FIG. 5 and store the character data 11b in the storage unit 11 when near field communication with the FIG. 5 becomes possible while the character selection screen is being displayed at the display unit 13, for example. The figure processing unit 22 performs processing to transmit the character data 11b stored in the storage unit 11 to the FIG. 5 and cause the FIG. 5 to write the character data 11b when near field communication with the FIG. 5 becomes possible after the ability values of an NPC are changed or the like and it becomes necessary to write data.

The display processing unit 23 generates a game screen corresponding to the processing result of the game processing unit 21 and gives the game screen to the display unit 13, so as to perform processing to display the game screen at the display unit 13. The display processing unit 23 performs processing to display various screens to be used for a game, such as the character selection screen illustrated in FIG. 1 or a screen to be used for performing operation to change the ability values of an NPC, at the display unit 13.

The selection accepting unit 24 performs processing to accept selection of a PC and an NPC when the character selection screen is being displayed at the display unit 13. The selection accepting unit 24 can accept selection of a PC and an NPC from a plurality of characters, which have been presented as choices in the character selection screen, on the basis of operation by the user performed at the operating unit 14. The selection accepting unit 24 can accept a character related to a FIG. 5, with which near field communication has been performed during display of the character selection screen, as selection of an NPC on the basis of near field communication with the FIG. 5 by the NFC unit 16.

The correlation processing unit 25 correlates a game device 1 with a FIG. 5. The correlation processing unit 25 determines whether a FIG. 5, with which near field communication has been performed at the NFC unit 16, is correlated with the game device 1 of the correlation processing unit 25 itself or not. When the FIG. 5 performs near field communication with the game device 1 for the first time, for example, the correlation processing unit 25 writes the device ID 11a, which is stored in the storage unit 11, in the FIG. 5 so as to correlate the FIG. 5 with the game device 1 of the correlation processing unit 25 itself. When the NFC unit 16 performs near field communication with a FIG. 5, the correlation processing unit 25 acquires a device ID stored in the FIG. 5, and determines whether the acquired device ID accords with the device ID 11a stored in the storage unit 11 or not, so as to determine whether the FIG. 5 is correlated with the game device 1 of the correlation processing unit 25 itself or not.

The award processing unit 26 performs processing to award an experience value, an item and the like to an NPC depending on the process, the processing result or the like of a match game processed by the game processing unit 21. The award processing unit 26 calculates an experience value to be awarded on the basis of the number of enemy characters which the NPC has beaten in a game, the strength of the enemy characters, given damage and the like, for example. The award processing unit 26 determines whether a predetermined award condition has been satisfied or not, and performs processing to award an item to an NPC for which the award condition has been satisfied. As the award condition, various conditions can be set such as winning in a match game, exceeding a threshold value of a hitting rate of attacking, or not exceeding a threshold of the number of times of being attacked by an opponent, for example. The award condition may have a certain degree of randomness. An item to be awarded by the award processing unit 26 has some influence on an NPC or on game processing when being used in a game. For example, the award processing unit 26 can award; an item, which changes the ability values of an NPC; an item such as a weapon to be equipped by an NPC; an item, which recovers the physical strength during a game; an item, which temporarily increases the offensive power during a game; or the like. In this embodiment, the award processing unit 26 awards an experience value, an item and the like to an NPC which has joined a match game depending on a FIG. 5. Information on the awarded experience value, item and the like is written in the FIG. 5 through near field communication.

Figure 3:
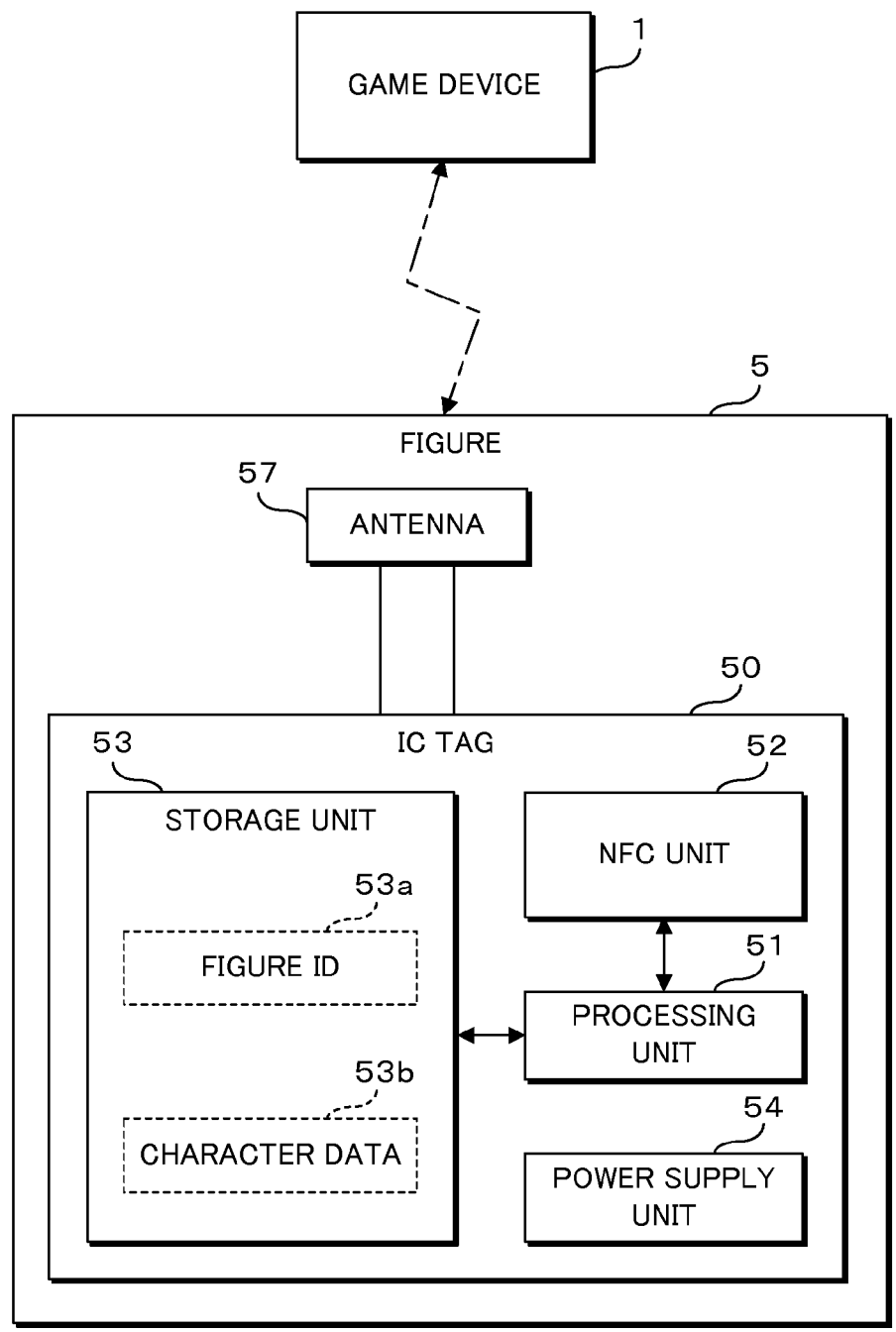
FIG. 3 shows an example non-limiting block diagram for illustrating the configuration of a figure.

FIG. 3 shows an example non-limiting block diagram for illustrating the configuration of a FIG. 5. A FIG. 5 according to this embodiment is a data storage medium constructed by burying the IC tag 50 and an antenna 57 inside a molded body made of synthetic resin or the like, for example. The antenna 57 may be constructed by disposing a metal wire in the FIG. 5 in a spiral manner and connecting both ends of the wire with the IC tag 50, for example. The IC tag 50 is provided as one IC chip. The IC tag 50 has therein a processing unit 51, a NFC unit 52, a storage unit 53, a power supply unit 54 and the like.

The IC tag 50 does not have a power source such as a battery, and is operated by electromotive force, which is generated by electromagnetic induction or the like when the antenna 57 receives a radio signal from a game machine 1. The IC tag 50 is a so-called passive type tag. The power supply unit 54 supplies electric power to the processing unit 51, the NFC unit 52, the storage unit 53 and the like in the IC tag 50 on the basis of the aforementioned electromotive force, and this operates the respective units. It is to be noted that an IC tag 50 may be of active type, though the IC tag 50 in this embodiment is of passive type.

The NFC unit 52 of the IC tag 50 receives a signal transmitted from the game device 1 at the antenna 57, and gives data related to the received signal to the processing unit 51. The NFC unit 52 transmits data, which has been given from the processing unit 51, from the antenna 57 to the game device 1. The storage unit 53 is constituted of a data-rewritable nonvolatile memory element. The storage unit 53 stores: a figure ID (IDentifier) 53a, which is individually attached to an IC tag 50; character data 53b, which is used in a game according to this embodiment; and the like. The processing unit 51 reads out data from the storage unit 53 depending on data given from the NFC unit 52, and gives the read data to the NFC unit 52 so as to transmit the data to the game machine 1. The processing unit 51 writes data in the storage unit 53 depending on data given from the NFC unit 52.

FIG. 4 shows an example non-limiting schematic diagram for illustrating an example of the character data 53b. The character data 53b, which is stored in the storage unit 53 of the IC tag 50 in the FIG. 5, includes information such as ability values of a character handled as an NPC in a game according to this embodiment. For example, the character data 53b may include information such as the name, level, experience value, physical strength, offensive power, defensive power, speed, owned item, AI (Artificial Intelligence) characteristic value and device ID of a character. The value or the like in the respective information illustrated in FIG. 4 is exemplary and not restrictive.

Information on a name included in the character data 53b is a name of a character, which the user has entered at the time of initial registration of the FIG. 5 or the like, a preset name, or the like. Information on a name is a term to be used for identifying a character. A level and an experience value are numerical values which rise when the character is used. Physical strength, offensive power, defensive power and a speed are numerical values which have an influence on processes of a match game. The numerical values increase or decrease depending on rise in the level, use of an item, or the like. An owned item is an item which has been awarded by the award processing unit 26 of the game device 1. Although an item name of herb is illustrated as an owned item in FIG. 4, an item identification number or the like may be stored as an owned item in the character data 53b.

An AI characteristic value included in the character data 53b is a value to be used for deciding the characteristic of an action when the game processing unit 21 of the game device 1 according to this embodiment controls the action of an NPC. In a game according to this embodiment, a value selected from 10 stages of 0 to 9 is set as an AI characteristic value, and the game processing unit 21 controls the action of the NPC so that the action becomes more offensive as the value is larger and the action becomes more defensive as the value is smaller. The AI characteristic value is a value which varies depending on the result of game processing by the game processing unit 21. Here, the NPC control method is exemplary and not restrictive. The device ID included in the character data 53b is a device ID 11a, which is written by the correlation processing unit 25 of the game device 1.

In this embodiment, the user can check information on the name, level, experience value, physical strength, offensive power, defensive power, speed and owned item included in the character data 53b by reading data of the FIG. 5 with the game device 1, for example. On the other hand, the AI characteristic value and device ID included in the character data 53b are internal information which the user cannot check.

<Figure Registration>

A game according to this embodiment does not necessarily require a FIG. 5 in a case where a game is played by selecting a character presented as a choice in the character selection screen, for example. However, by playing a game using the FIG. 5, the user can enjoy not only a match game but also growing an NPC. The FIG. 5 may be sold together with the recording medium 91, or may be provided with or without charging separately from the recording medium 91. The user can acquire a FIG. 5 with or without charging, and use the FIG. 5 in a game.

When acquiring a new FIG. 5, the user registers the FIG. 5 with the game device 1. For example, the user can register the FIG. 5 by selecting a point of figure registration from a menu screen (illustration is omitted) displayed at the display unit 13 of the game device 1 in a game according to this embodiment. When a point of figure registration is selected, the processing unit 10 of the game device 1 performs processing to register the FIG. 5, i.e., processing to correlate the FIG. 5 with the game device 1, at the correlation processing unit 25. The processing unit 10 displays a message, which prompts the user to put the FIG. 5 to be registered close to the NFC unit 16, at the display unit 13, and communicates with the FIG. 5, which has become able to perform near field communication, in response thereto. At this time, the processing unit 10 confirms that the character data 53b is not stored in the storage unit 53 of the FIG. 5. In a case where the character data 53b has already been stored in the storage unit 53 of the FIG. 5, the processing unit 10 determines that the figure is a registered figure, and displays an error message or the like and suspends registration processing.

Although it is assumed in this embodiment that the character data 53b is not stored in the storage unit 53 of an unregistered FIG. 5, the present invention is not limited to this. A part of information, an initial value or the like of the character data 53b may be prestored in the storage unit 53 of an unregistered FIG. 5. For example, information to be used for identifying a character corresponding to the shape of a FIG. 5 can be prestored in the storage unit 53 of an unregistered FIG. 5. In such a case, the processing unit 10 of the game device 1 can determine whether the FIG. 5 is a registered figure or not depending on whether the device ID is stored in the storage unit 53 of the FIG. 5 or not, for example.

In registration processing of the FIG. 5, the processing unit 10 displays a figure registration screen (illustration is omitted) at the display unit 13. In the figure registration screen, the user can enter the name of a character, for example. The processing unit 10 acquires a figure ID 53a through near field communication with the FIG. 5, and displays a character corresponding to the figure ID 53a in the figure registration screen, and decides and displays initial values of the ability values of the character.

After entering of necessary information such as the name of a character is completed, the processing unit 10 generates the character data 53b illustrated in FIG. 4. The character data 53b generated at this time includes the device ID 11a stored in the storage unit 11. The processing unit 10 correlates the game device 1 with the FIG. 5 by writing the device ID 11a in the storage unit 53 of the FIG. 5. The processing unit 10 displays a message, which prompts the user to put the FIG. 5 subject to registration close to the NFC unit 16, at the display unit 13. The processing unit 10 performs near field communication with the FIG. 5 at the NFC unit 16 so as to acquire the figure ID 53a, and determines whether the figure ID 53a accords with a figure ID 53a to be registered or not. When the acquired figure ID 53a is correct, the processing unit 10 writes the generated character data 53b in the FIG. 5, and terminates registration processing.

Figure 6:
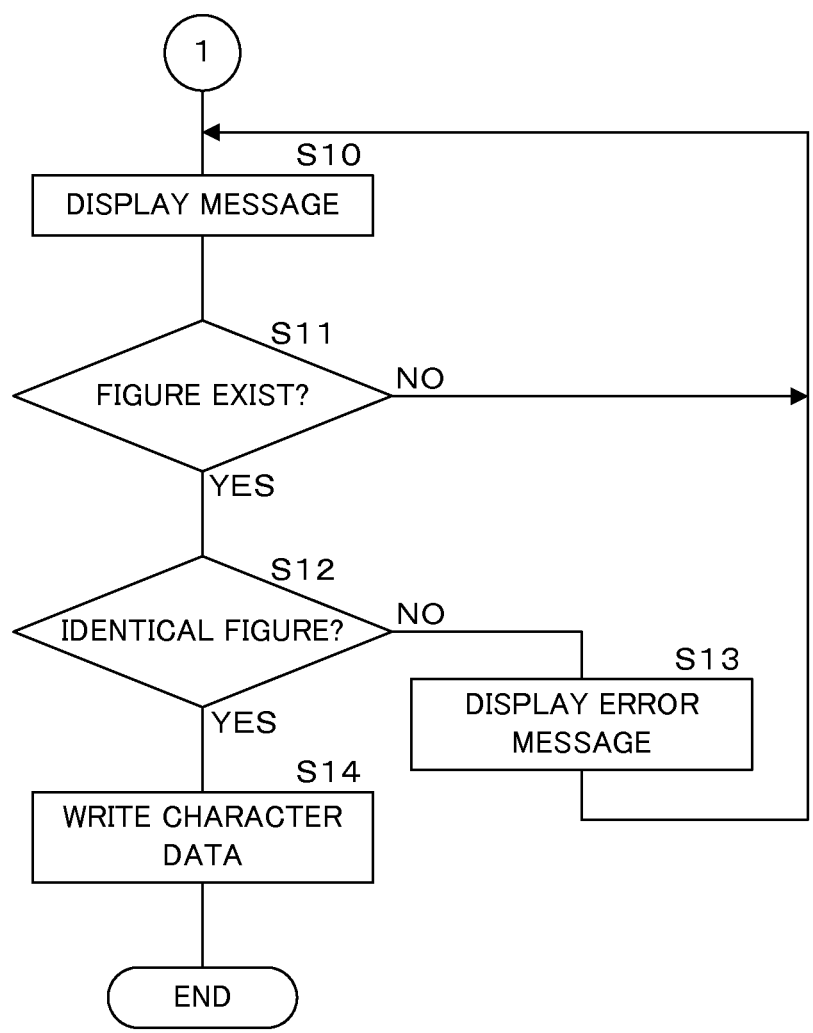
FIG. 6 shows an example non-limiting flowchart for illustrating the procedures of figure registration processing to be performed by a game device.

FIGS. 5 and 6 show an example non-limiting flowchart for illustrating the procedures of figure registration processing to be performed by the game device 1. The processing unit 10 of the game device 1 displays a message, which prompts the user to put a FIG. 5 to be registered close to a predetermined portion of a housing, at the display unit 13 (step S1). The predetermined portion of the housing is a portion where the NFC unit 16 is disposed, for example. The processing unit 10 acquires the result of near field communication by the NFC unit 16, and determines whether a FIG. 5 exists within a communication range or not on the basis of the result (step S2). When any FIG. 5 does not exist (S2: NO), the processing unit 10 returns the processing to step S1.

When a FIG. 5 exists within the near field communication range (S2: YES), the processing unit 10 performs near field communication with the FIG. 5 at the NFC unit 16, and reads data stored in the storage unit 53 from the FIG. 5 (step S3). The processing unit 10 determines whether the character data 53b is stored in the storage unit 53 of the FIG. 5 or not on the basis of the result of data reading from the FIG. 5 (step S4). When character data 53b is stored (S4: YES), which means that the FIG. 5 is a registered figure, the processing unit 10 displays an error message at the display unit 13 (step S5), and terminates figure registration processing.

When the character data 53b is not stored in the storage unit 53 of the FIG. 5 (S4: NO), the processing unit 10 sets initial values of the ability values of a character on the basis of the figure ID 53a read out from the FIG. 5 (step S6). The processing unit 10 displays a figure registration screen at the display unit 13, and accepts entering of the name of the character and the like (step S7). The processing unit 10 acquires a device ID 11a stored in the storage unit 11 (step S8). The processing unit 10 generates character data 11b on the basis of information obtained in steps S6 to S8 (step S9), and advances the processing to step S10.

Although initial values of the ability values of a character are set at the time of registration of the FIG. 5 in this embodiment, the present invention is not limited to this. For example, initial values of the ability values of a character corresponding to a figure preset in the game program 91a may be read out and used when character data 53b is not stored in a storage unit 53 of the FIG. 5, and ability values may be written in the FIG. 5 when the ability values change. Alternatively, the game device 1 is not required to set initial values of the ability values of a character at the time of registration processing of a FIG. 5 in a case where initial values of the ability values of a character are prestored in a storage unit 53 of an unregistered FIG. 5, and information in the FIG. 5 may be updated when the ability values change.

Next, the processing unit 10 displays a message, which prompts the user to put a FIG. 5 subject to registration close to a predetermined portion of a housing, at the display unit 13 (step S10). The processing unit 10 determines whether a FIG. 5 exists within the communication range of the NFC unit 16 or not (step S11). When any FIG. 5 does not exist (S11: NO), the processing unit 10 returns the processing to step S10.

When a FIG. 5 exists within the near field communication range (S11: YES), the processing unit 10 determines whether the FIG. 5 is identical to the FIG. 5, from which data has been read out in step S3, or not on the basis of the figure ID 53a obtained through near field communication with the FIG. 5 (step S12). When it is determined that the FIG. 5 are not identical (S12: NO), the processing unit 10 displays an error message at the display unit 13 (step S13), and returns the processing to step S10. When it is determined that the figures are identical (S12: YES), the processing unit 10 writes the character data 11b, which has been generated in step S9, in the FIG. 5 through near field communication (step S14), and terminates the processing.

<Character Selection>

In the case of a game wherein a plurality of characters play a match, the user selects a point of a match game from a menu screen displayed at the display unit 13 of the game device 1, for example, so as to initiate a game. When a point of a match game is selected, the processing unit 10 of the game device 1 performs processing to accept selection of a PC or an NPC to join the match game at the selection accepting unit 24. The processing unit 10 displays the character selection screen illustrated in FIG. 1 at the display unit 13. The character selection screen illustrated in FIG. 1 corresponds to a case where four characters play a match. In the character selection screen, selectable characters are listed at an upper portion, and four characters which have been selected as PCs or NPCs are displayed at a lower portion.

A part or all of the plurality of selectable characters listed at an upper portion of the character selection screen are provided together with the game program 91a. Data such as the ability values of the characters is included in the game program 91a. The processing unit 10 reads out data, which pertains to the game program 91a, so as to list the characters in the character selection screen. In this embodiment, the level, experience value and the like are not set for the characters listed in the character selection screen, and the ability values do not change depending on the result of a game. Here, the ability values for the characters may be constructed to change.

In a state where the character selection screen is being displayed, the user can move a cursor (illustration is omitted) or the like to a required character using the cross key of the operating unit 14, and push the push button so as to select the character as a PC or an NPC. In the example illustrated in FIG. 1, a rabbit character and a frog character are being selected by such a method. Whether the character is to be a PC or an NPC can be selected by the user and accepted by displaying a message, a dialog box or the like, which inquires whether the selected character is to be a PC or an NPC, after the aforementioned character selection operation, for example.

Moreover, the user can perform NPC selection operation using the FIG. 5. When the character selection screen is being displayed at the display unit 13 and at least one character to join a match game has not been selected, the processing unit 10 of the game device 1 waits in a state where the NFC unit 16 is able to accept near field communication with the FIG. 5. When the user puts the FIG. 5 close to a predetermined portion of the game device 1 in such a state, near field communication by the NFC unit 16 with the FIG. 5 is performed. The processing unit 10 reads out the character data 53b, which is stored in the storage unit 53, from the FIG. 5, and stores the character data 53b as character data 11b in the storage unit 11 of the processing unit 10 itself. The processing unit 10 determines that a character corresponding to the character data 11b has been selected as an NPC, and displays this in the character selection screen. In the example illustrated in FIG. 1, a mouse character and an elephant character are being selected as NPCs by such a method. In this embodiment, a character based on the FIG. 5 is selected as an NPC, and cannot be selected as a PC.

Figure 7:
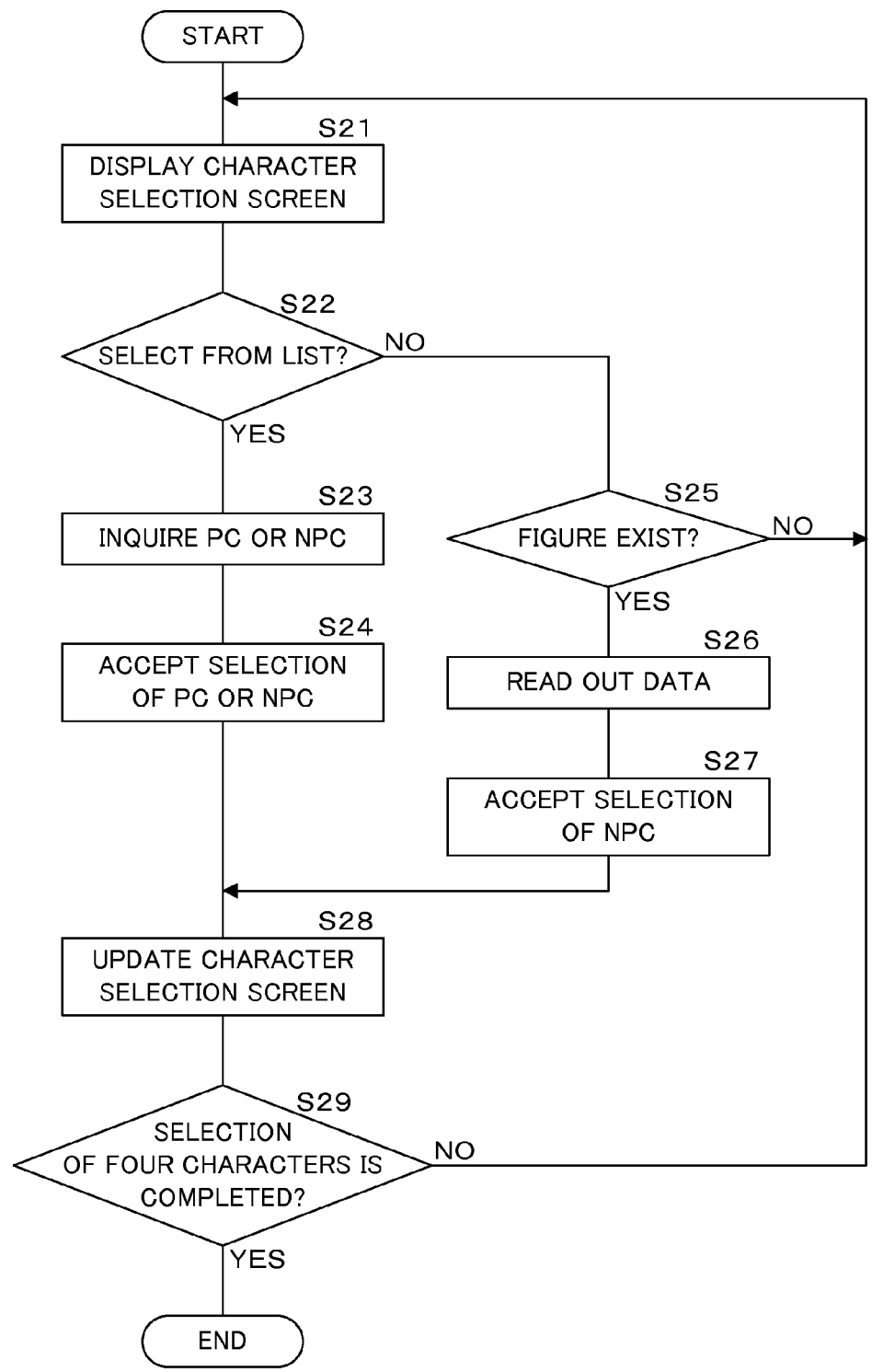
FIG. 7 shows an example non-limiting flowchart for illustrating the procedures of character selection acceptance processing to be performed by a game device.

FIG. 7 shows an example non-limiting flowchart for illustrating the procedures of character selection acceptance processing to be performed by the game device 1. The processing unit 10 of the game device 1 displays the character selection screen at the display unit 13 (step S21). The selection accepting unit 24 of the processing unit 10 determines whether any character has been selected from a list of characters, which is displayed in the character selection screen, or not on the basis of operation to the operating unit 4 (step S22). When a character is selected from the list (S22: YES), the selection accepting unit 24 displays a message, which inquires whether the selected character is to be used as a PC or an NPC, at the display unit 13 (step S23). The selection accepting unit 24 accepts selection of a PC or an NPC on the basis of operation to the operating unit 4 (step S24), and advances the processing to step S28.

When any character has not been selected from the list (S22: NO), the selection accepting unit 24 determines whether a FIG. 5 exists within the communication range of the NFC unit 16 or not (step S25). When any FIG. 5 does not exist (S25: NO), the processing unit 10 returns the processing to step S21. When a FIG. 5 exists within the communication range (S25: YES), the selection accepting unit 24 reads out data such as the figure ID 53 and the character data 53b from the FIG. 5 at the NFC unit 16 (step S26). The selection accepting unit 24 accepts selection of a character corresponding to the read data as an NPC (step S27), and advances the processing to step S28.

After accepting selection of a PC or an NPC from a character list or after accepting selection of an NPC based on the FIG. 5, the selection accepting unit 24 updates the character selection screen depending on the accepted selection (step S28). The selection accepting unit 24 determines whether selection of four characters to join a match game has been completed or not (step S29). When selection has not been completed (S29: NO), the selection accepting unit 24 returns the processing to step S21. When selection has been completed (S29: YES), the selection accepting unit 24 terminates selection acceptance processing.

<Game Processing>

Figure 8:
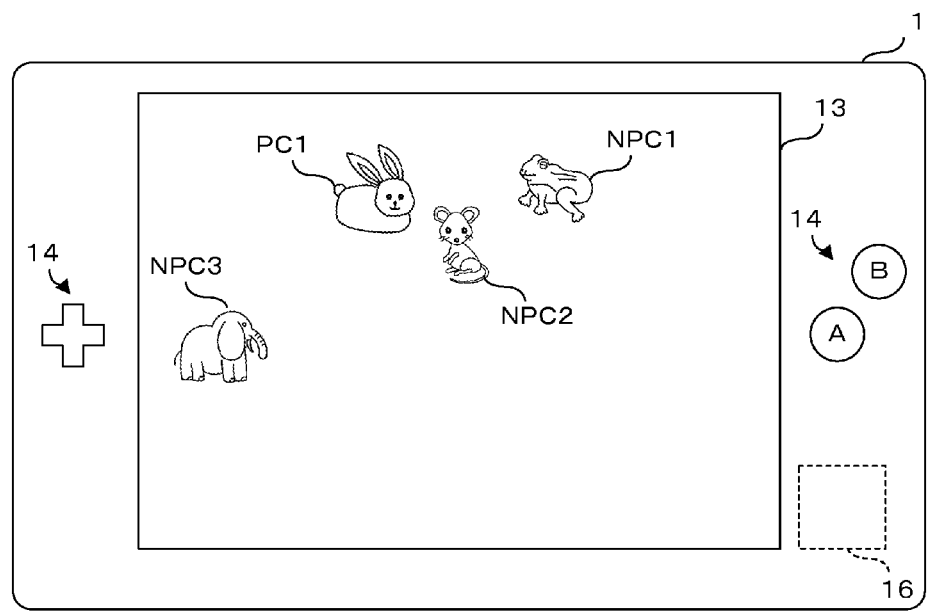
FIG. 8 shows an example non-limiting schematic diagram for illustrating an example of a game screen.

After selection of characters to join a match game in the character selection screen is completed, the processing unit 10 of the game device 1 starts processing related to a game, wherein four selected characters play a match, at the game processing unit 21. FIG. 8 shows an example non-limiting schematic diagram for illustrating an example of a game screen. In this example, displayed at the display unit 13 of the game device 1 is a game screen wherein a rabbit character selected as PC1, a frog character selected as NPC1, a mouse character selected as NPC2, and an elephant character selected as NPC3 are arranged on a field. In a game according to this embodiment, four characters attack each other with the aim of decreasing the physical strength or the like of opponents to zero and surviving the match as the last one character. Each character can take actions such as movement, offence, defense and a lethal technique.

A character, which has been selected as a PC in the character selection screen, is operated during a game on the basis of operation by the user to the operating unit 14. The game processing unit 21 of the game device 1 moves a PC depending on operation to the cross key of the operating unit 14 and causes the PC to take an action such as offense, defense or a lethal technique depending on operation to the push button, for example. On the other hand, the game processing unit 21 causes a character, which has been selected as an NPC, to take an action such as movement, offense, defense and a lethal technique on the basis of a predetermined algorithm. At this time, the game processing unit 21 changes the action pattern of the character on the basis of the AI characteristic value included in the character data 11b.

The game processing unit 21 performs processing such as determination of success or failure of attacking and damage calculation in the case of attacking success, depending on the action of each character. The display processing unit 23 generates a game screen on the basis of the processing result of the game processing unit 21, and displays the game screen at the display unit 13. A game proceeds as the game processing unit 21 and the display processing unit 23 repeatedly perform processing. The game processing unit 21 terminates a match game when one character survives a game or when a predetermined period of time elapses in a match, for example, and decides victory or defeat, ranking, or the like of the four characters. After the result of the match game is determined, the display processing unit 23 displays a screen, which notifies the game result, at the display unit 13.

In a game according to this embodiment, an experience value, an item and the like corresponding to the process, result and the like of game processing are awarded to an NPC based on a FIG. 5 among characters which have joined the match game. In a case where an NPC based on a FIG. 5 has joined the match game, the display processing unit 23 of the game device 1 displays a character growth screen, which notifies the user of the experience value and item and the like given to the NPC and the ability values of the character that have been changed thereby, at the display unit 13.

Figure 9:
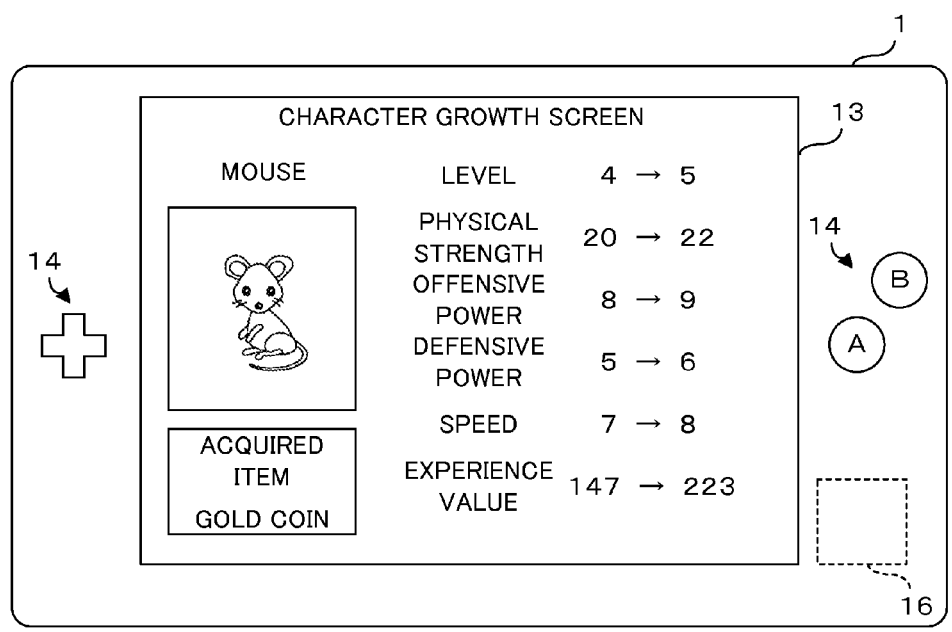
FIG. 9 shows an example non-limiting schematic diagram for illustrating an example of a character growth screen.

FIG. 9 shows an example non-limiting schematic diagram for illustrating an example of a character growth screen. In this example, a character growth screen of a mouse character, which has joined a game as NPC2, is illustrated. In the character growth screen, the name, image and the like to be used for identifying an NPC, the ability values of which or the like have been changed, are displayed. In the character selection screen, changes in the ability values of the NPC are displayed. That is, in the character selection screen, ability values before initiation of a game and ability values changed by execution of the game are displayed. When any item is awarded to an NPC, an item name such as a gold coin is displayed as an acquired item in the character selection screen.

The award processing unit 26 of the game device 1 collects information, such as a result of a match game (e.g., ranking), the level of a beaten enemy character, damage to an enemy character, or damage from an enemy character, during a game or after termination of a game. The award processing unit 26 calculates an experience value to be awarded to each NPC on the basis of such information. In this embodiment, the award processing unit 26 adjusts the experience value, which has been calculated on the basis of such information, considering another conditions.

The award processing unit 26 determines whether a game device 1, with which a match game has been played, is correlated with the FIG. 5 or not at the correlation processing unit 25. The award processing unit 26 adjusts the experience value to be increased when the game device 1 is not correlated with the FIG. 5. In such a case, the award processing unit 26 increases the experience value by 1.2 times, for example. The correlation processing unit 25 compares a device ID 11a of a game device 1, with which a match game has been played, with a device ID included in the character data 53b stored in the FIG. 5, and determines whether the game device 1 is correlated with the FIG. 5 or not on the basis of whether the IDs accord with each other or not. The IDs do not accord with each other in a case where the user has played a match game using the FIG. 5 with a game device 1, which is different from his own game device 1 that has been used for registration of the FIG. 5, e.g., a game device 1 owned by his friend. By increasing the experience value in such a case, it is possible to prompt the user to play a game according to this embodiment together with his friend or the like. It is to be noted that increase in the experience value under such a condition may be limited to the maximum of five times of matches in a row, for example.

The award processing unit 26 determines whether another character, which has played a match with an NPC based on the FIG. 5 in a match game, is an NPC based on another FIG. 5 or not. When an NPC based on another FIG. 5 is included in characters of opponents, the award processing unit 26 adjusts the experience value to be increased. In such a case, the award processing unit 26 increases the experience value by 1.2 times, for example. By increasing the experience value in such a case, it is possible to prompt the user to play a game using a plurality of FIG. 5.

The award processing unit 26 adjusts the experience value depending on the number of characters which have joined a match game. In a game according to this embodiment, two to four characters can join a match game. The award processing unit 26 uses a case where the number of characters which join a match game is 2 as a standard, and increases the experience value by 1.1 times when the number of characters is 3, or increases the experience value by 1.2 times when the number of characters is 4.

In a case where all the aforementioned three conditions are satisfied, the award processing unit 26 may award an experience value obtained by increasing the standard experience value by 1.2×1.2×1.2 times, or may set increase limitation of the experience value to 1.2 times.

The award processing unit 26 performs processing to award an item to an NPC which has joined a match game. In this embodiment, the award processing unit 26 decides whether an item is to be awarded to each NPC or not, and which kind of an item is to be awarded, for example, on the basis of random numbers generated by a predetermined algorithm. At this time, the award processing unit 26 adjusts the probability of awarding an item or the quantity of awarded items on the basis of processing result or the like of a match game by the game processing unit 21. For example, the award processing unit 26 increases the probability of awarding an item or the quantity of awarded items regarding a character with a higher game record in a match game.

In this embodiment, the award processing unit 26 determines whether another character, which has been used for a match with an NPC of the FIG. 5 in a match game, is a PC operated by the user or not. When a PC operated by the user is included in characters of opponents, the award processing unit 26 increases the probability of awarding an item or the quantity of awarded items. In this embodiment, the award processing unit 26 adjusts the probability of awarding an item or the quantity of awarded items corresponding to the number of characters which have joined a match game. The award processing unit 26 increases the probability of awarding an item or the quantity of awarded items as the number of characters which have joined a match game becomes larger.

In this embodiment, the award processing unit 26 adjusts the probability of awarding an item or the quantity of awarded items depending on correlation of a game device 1, with which a match game has been played, with a FIG. 5. For example, the award processing unit 26 awards an item with a high probability to an NPC of a FIG. 5 that is not correlated with a game device 1 with which a match game has been played. This can prompt the user to play a game according to this embodiment together with his friend or the like. It is to be noted that the award processing unit 26 in this embodiment may not adjust the quantity of awarded items under such a condition.

It is to be noted that the award processing unit 26 may decide the type of an item to be awarded depending on a random number. In such a case, the game device 1 preliminarily stores a table or the like wherein random numbers are associated with item types. The award processing unit 26 can be constructed to decide the type of an item referring to the table depending on a generated random number. The award processing unit 26 may decide the type of an item depending on a condition of the surrounding environment such as a field or a stage where a match has been played, for example. The award processing unit 26 may decide the type of an item depending on the game record in a game.

In order to allow the award processing unit 26 to award an experience value and an item as described above, the game processing unit 21 accumulates and stores actions of each character during a match game, the result of such actions, and the like. The award processing unit 26 acquires information accumulated by the game processing unit 21 after termination of a match game. The award processing unit 26 calculates the game record or the like of each character on the basis of the acquired information, and decides an experience value and an item to be awarded, on the basis of the calculation result. Information to be accumulated by the game processing unit 21 is only required to include at least information on a character based on a FIG. 5.

Figure 10:
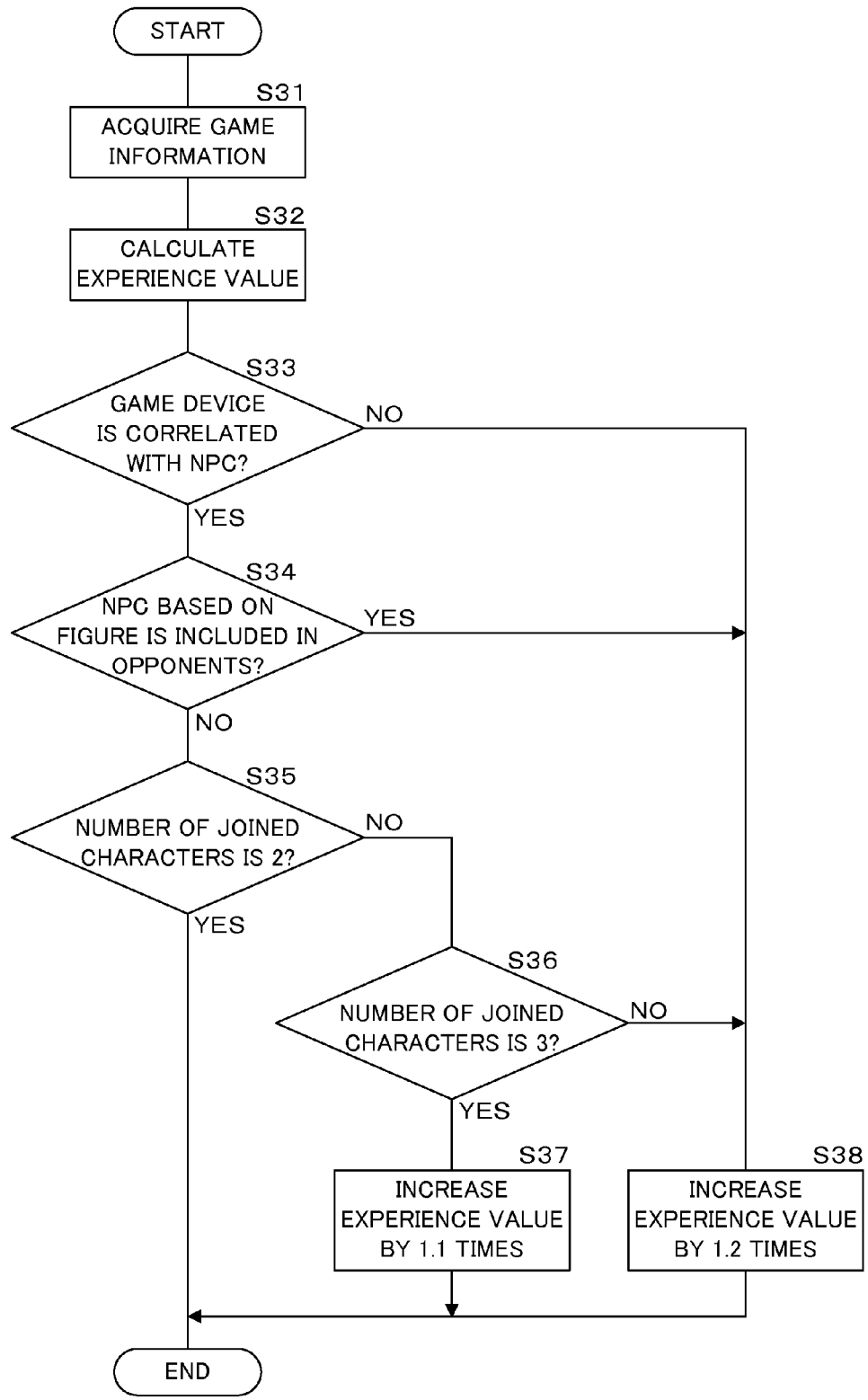
FIG. 10 shows an example non-limiting flowchart for illustrating the procedures of experience value award processing to be performed by a game device.

FIG. 10 shows an example non-limiting flowchart for illustrating the procedures of experience value award processing to be performed by the game device 1. After termination of a match game, the award processing unit 26 of the game device 1 acquires information on a game accumulated by the game processing unit 21 (step S31). The award processing unit 26 calculates a standard experience value on the basis of the acquired information (step S32). The award processing unit 26 determines whether a game device 1 of the award processing unit 26 itself is correlated with an NPC or not at the correlation processing unit 25 on the basis of character data 11b of the NPC subject to processing (step S33). When the correlation processing unit 25 determines that the game device 1 is not correlated with the NPC (S33: NO), the award processing unit 26 increases the experience value, which has been calculated in step S32, by 1.2 times (step S38), awards the experience value to the NPC subject to processing, and terminates the processing.

When the correlation processing unit 25 determines that the game device 1 is correlated with the NPC (S33: YES), the award processing unit 26 determines whether an NPC based on a FIG. 5 is included in opponents in a match game or not (step S34). When an NPC based on a FIG. 5 is included (S34: YES), the award processing unit 26 increases the experience value, which has been calculated in step S32, by 1.2 times (step S38), awards the experience value to an NPC subject to processing, and terminates the processing.

When an NPC based on the FIG. 5 is not included in opponents (S34: NO), the award processing unit 26 counts the number of characters which have joined a match game, and determines whether the number of characters which have joined the match game is 2 or not (step S35). When the number of joining characters is 2 (S35: YES), the award processing unit 26 awards the experience value, which has been calculated in step S32, to the NPC subject to processing, and terminates the processing. When the number of joining characters is not 2 (S35: NO), the award processing unit 26 further determines whether the number of joining characters is 3 or not (step S36). When the number of joining characters is 3 (S36: YES), the award processing unit 26 increases the experience value, which has been calculated in step S32, by 1.1 times (step S37), awards the experience value to the NPC subject to processing, and terminates the processing. When the number of joining characters is not 3 (S36: NO), that is, when the number of joining characters is 4, the award processing unit 26 increases the experience value, which has been calculated in step S32, by 1.2 times (step S38), awards the experience value to the NPC subject to processing, and terminates the processing.

Figure 11:
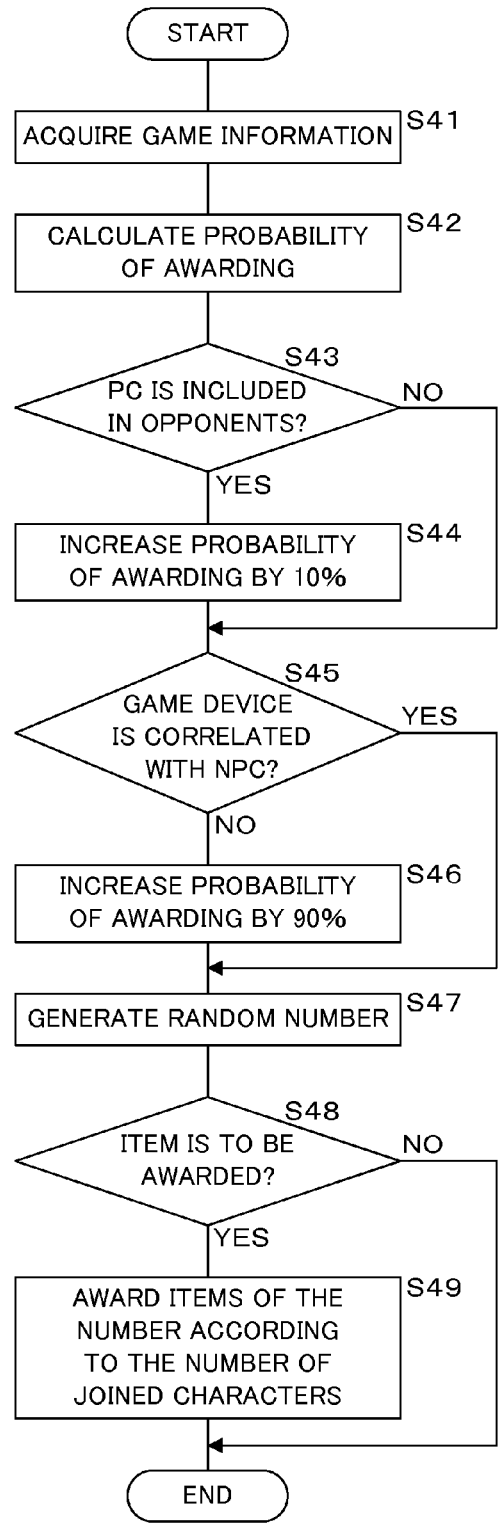
FIG. 11 shows an example non-limiting flowchart for illustrating the procedures of item award processing to be performed by a game device.

FIG. 11 shows an example non-limiting flowchart for illustrating the procedures of item award processing to be performed by the game device 1. After termination of a match game, the award processing unit 26 of the game device 1 acquires information on a game accumulated by the game processing unit 21 (step S41). The award processing unit 26 calculates a standard probability of awarding on the basis of the acquired information (step S42). The award processing unit 26 determines whether a PC operated by the user is included in opponents in the match game or not (step S43). When the PC is included in opponents (S43: YES), the award processing unit 26 increases the probability of awarding, which has been calculated in step S42, by 10% (step S44), and advances the processing to step S45. When the PC is not included in opponents (S43: NO), the award processing unit 26 advances the processing to step S45.

The award processing unit 26 determines whether the game device 1 of the award processing unit 26 itself is correlated with the NPC subject to processing or not at the correlation processing unit 25 on the basis of the character data 11b of the NPC (step S45). When the correlation processing unit 25 determines that the game device 1 is not correlated with the NPC (S45: NO), the award processing unit 26 increases the probability of awarding, which has been calculated in step S42, by 90% (step S46), and advances the processing to step S47. When the correlation processing unit 25 determines that the game device 1 is correlated with the NPC (S45: YES), the award processing unit 26 advances the processing to step S47. It is to be noted that the probability of awarding is increased by 90% in step S46 on the assumption that a probability of awarding, which is calculated in step S42, is equal to or higher than 10% because an item is always awarded to an NPC related to a FIG. 5 when the FIG. 5 is used at a game device 1 which is not correlated in this embodiment. Here, the aforementioned values are exemplary and not restrictive. When a FIG. 5 is used at a game device 1 which is not correlated, an item is not always awarded to an NPC related to the FIG. 5 but may be awarded at a high probability. In such a case, the probability of awarding may be increased by 50% in step S46, for example.

The award processing unit 26 generates a random number by a predetermined algorithm (step S47). The award processing unit 26 determines whether an item is to be awarded to an NPC or not on the basis of the probability of awarding an item of the NPC and the generated random number (step S48). For example, the award processing unit 26 may be constructed to generate a random number of 1 to 100 and compare the random number with the probability of awarding of the NPC, and determine that an item is to be awarded to the NPC when the random number is smaller than the probability of awarding. When determining that an item is to be awarded (S48: YES), the award processing unit 26 awards items, the number of which corresponds to the number of characters that have joined a match game, to the NPC (step S49), and terminates the processing. When determining that an item is not to be awarded (S48: NO), the item awarding unit 26 terminates the processing.

Moreover, in this embodiment, the award processing unit 26 of the game device 1 performs processing to change the AI characteristic value, which is included in the character data 53b of the NPC based on the FIG. 5, on the basis of actions or the like of the NPC during a game. The award processing unit 26 increases the AI characteristic value so as to cause an NPC to act offensively when the number of times an NPC is attacked by another character during a game, the number of damages by being attacked, or the like exceeds a threshold, for example. The award processing unit 26 decreases the AI characteristic value so as to cause an NPC to act defensively when the number of times attacking of the NPC is prevented by another character during a game or the like exceeds a threshold value, for example. By changing the AI characteristic value in such a manner, an NPC can represent growth of a character imitating actions of an opponent character, against which the NPC has played a match during a game.

The AI characteristic value is changed by the award processing unit 26 every time one match is terminated as with awarding of an experience value and an item. Therefore, actions of the NPC based on the changed AI characteristic value are executed from the next match.

<Write Processing to Figure>

When an experience value, an item and the like are awarded to an NPC, the awarded information is reflected on the character data 11b stored in the storage unit 11. The user is required to write data in the FIG. 5 so as to save the information. After displaying the character growth screen and notifying the user of growth of the NPC, the game device 1 displays a data write screen at the display unit 13 so as to prompt the user to write the character data 11b of the NPC in the FIG. 5.

Figure 12:
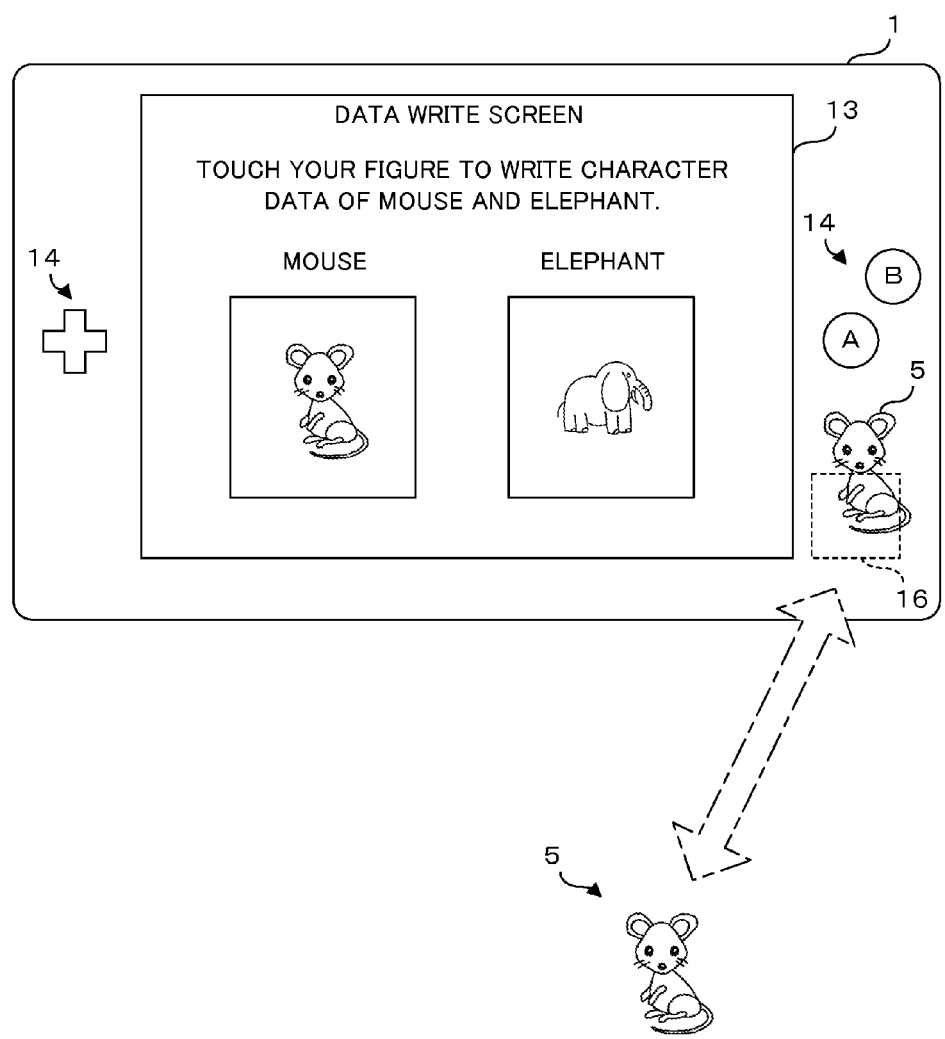
FIG. 12 shows an example non-limiting schematic diagram for illustrating an example of a data write screen.

FIG. 12 shows an example non-limiting schematic diagram for illustrating an example of a data write screen. In this example, illustrated is a data write screen of a case where a mouse NPC and an elephant NPC join a match game, the ability values change, and it becomes necessary to write data in FIG. 5 corresponding to the NPCs. In the data write screen, a message such as "Touch your figure to write character data of mouse and elephant" is displayed, for example. In the data write screen, the name, image and the like of the NPCs subject to data writing are displayed side by side. The user can write data in a mouse FIG. 5 or an elephant FIG. 5 subject to data writing by putting the FIG. 5 close to a predetermined portion of the game device 1.

When the NFC unit 16 becomes able to perform near field communication with the FIG. 5 while the data write screen is being displayed, the figure processing unit 22 of the game device 1 performs processing to write the character data 11b, which is stored in the storage unit 11, in the FIG. 5. The figure processing unit 22 acquires the figure ID 53a through communication by the NFC unit 16 with the FIG. 5, and determines whether the FIG. 5 of a communication partner is a FIG. 5 subject to data writing or not. That is, the figure processing unit 22 determines whether the figure ID 53a, which is acquired from the FIG. 5 through near field communication this time, accords with a figure ID 53a, which has been acquired through near field communication with a FIG. 5 while the character selection screen is being displayed, or not. When the FIG. 5 of a communication partner is subject to data writing, the figure processing unit 22 reads out updated character data 11b from the storage unit 11 regarding a character corresponding to the FIG. 5 of the communication partner. The figure processing unit 22 transmits the read character data 11b together with a write instruction from the NFC unit 16. When the write instruction and the character data 11b are given from the game device 1 through near field communication, the FIG. 5 writes the character data 53b in the storage unit 53.

In a game according to this embodiment, it is possible to cause four NPCs based on four FIG. 5 to play a match under control of the game device 1. When a game is played using a plurality of FIG. 5 and an experience value, an item and the like are awarded to a plurality of NPCs, the user is required to write data in a plurality of FIG. 5. In the example illustrated in FIG. 12, a message to prompt the user to write data in a mouse NPC and an elephant NPC is displayed, and the user is required to write data in FIG. 5 corresponding to the two NPCs. In such a case, the game device 1 according to this embodiment can start data writing from a FIG. 5 corresponding to any NPC. That is, no limitation exists in the order of data writing in a plurality of FIG. 5. The figure processing unit 22 reads out corresponding character data 11b from a storage unit 11 depending on a figure ID 53a, which has been acquired from a FIG. 5 through near field communication, and writes data.

Figure 13:
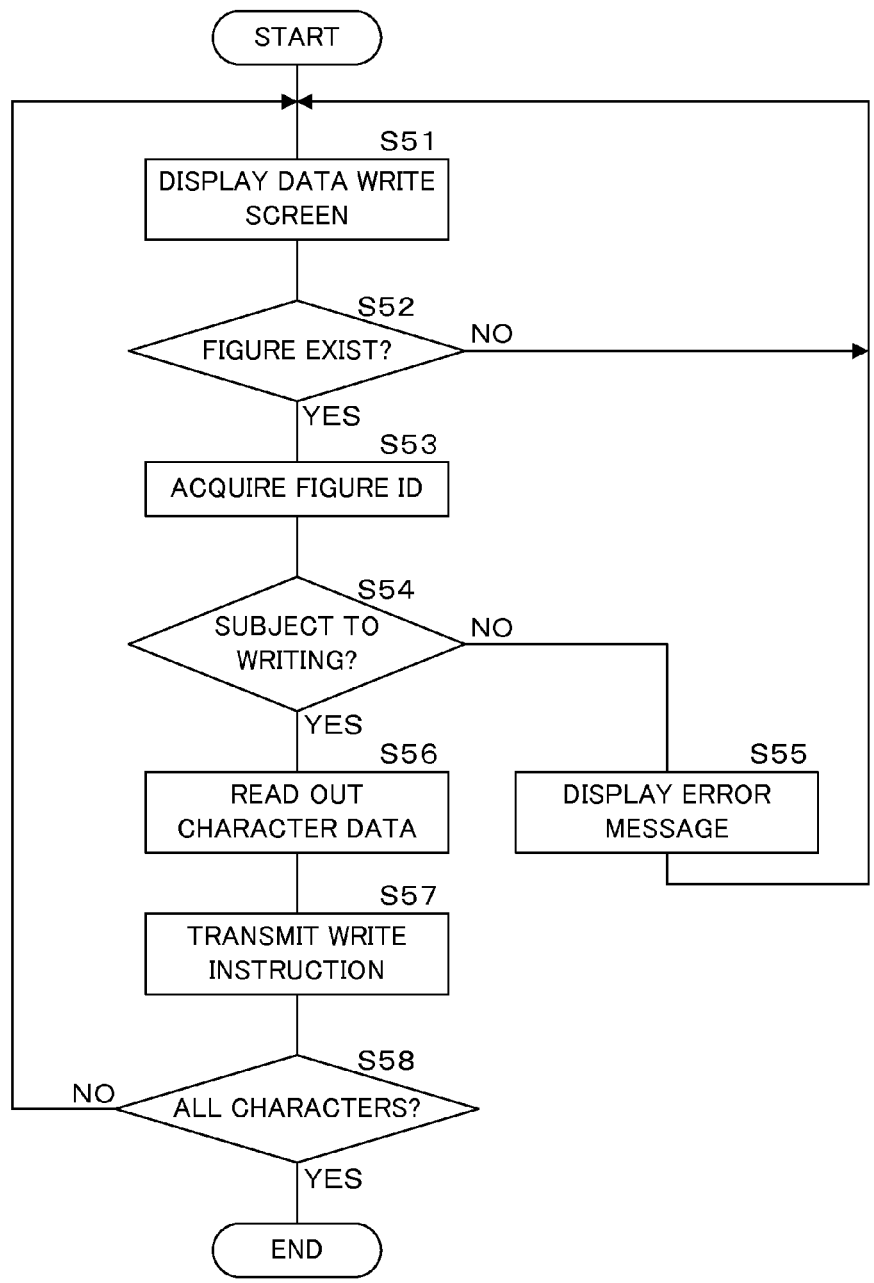
FIG. 13 shows an example non-limiting flowchart for illustrating the procedures of data write processing to be performed by a game device.

FIG. 13 shows an example non-limiting flowchart for illustrating the procedures of data write processing to be performed by the game device 1. The processing unit 10 of the game device 1 displays a data write screen at the display unit 13 (step S51). The figure processing unit 22 of the processing unit 10 determines whether a FIG. 5 exists within the communication range of the NFC unit 16 or not (step S52). When any FIG. 5 does not exist (S52: NO), the figure processing unit 22 returns the processing to step S51. When a FIG. 5 exists within the communication range (S52: YES), the figure processing unit 22 acquires a figure ID 53 from the FIG. 5 at the NFC unit 16 (step S53).

The figure processing unit 22 determines whether the figure ID 53a, which has been acquired in the step S53, corresponds to an NPC subject to writing or not (step S54). When the figure ID 53a does not correspond to an NPC subject to writing (S54: NO), the figure processing unit 22 displays an error message at the display unit 13 (step S55), and returns the processing to step S51.

When the figure ID 53a corresponds to an NPC subject to writing (S54: YES), the figure processing unit 22 reads out character data 11b corresponding to the NPC from the storage unit 11 (step S56). The figure processing unit 22 transmits a data write instruction together with the read character data 11b to the FIG. 5 (step S57). The figure processing unit 22 determines whether processing for all characters for which data is to be written has been terminated or not (step S58). When there still remains a character for which data is not written (S58: NO), the figure processing unit 22 returns the processing to step S51. When data writing for all characters has been terminated (S58: YES), the figure processing unit 22 terminates data write processing.

<Conclusion>

The game device 1 according to this embodiment having the aforementioned configuration performs near field communication with the IC tag 50 of the FIG. 5 at the NFC unit 16, and acquires the character data 53b stored in the storage unit 53 of the IC tag 50. The game device 1 performs game processing to cause a character corresponding to the acquired character data 53b to act as an NPC. The game device 1 preliminarily stores the acquired character data 53b in the storage unit 11 as character data 11b, and changes the character data 11b depending on the result of game processing. This allows the game device 1 according to this embodiment to enhance the amusement of a game or the like which utilizes a data storage medium such as a FIG. 5.

Moreover, the game device 1 writes the character data 11b, which has been changed depending on the result of game processing, in the FIG. 5 through near field communication so as to update the character data 53b stored in the storage unit 53 of the FIG. 5. This makes it possible to record growth or the like of an NPC in the FIG. 5 and read out data of the FIG. 5 with a different game device 1, so that the user can enjoy a game using a grown NPC.

The game device 1 can cause a plurality of NPCs to join a match game on the basis of a plurality of character data 53b read out from a plurality of FIG. 5. The game device 1 changes the character data 11b of a plurality of NPCs depending on the result of a game, and writes the changed character data 11b in corresponding FIG. 5. This makes it possible to realize a match or the like between NPCs using the FIG. 5, and enhance the amusement of a game.

The game device 1 accepts selection of characters which play a game in cooperation, i.e., characters to join a match game and play a match. The game device 1 can accept selection of a character using a FIG. 5, and the accepted character is handled as an NPC. The game device 1 can accept selection of a plurality of NPCs through near field communication with a plurality of FIG. 5, and controls the plurality of NPCs independently. The game device 1 can list prepared characters in a character selection screen, and accept selection of an NPC from the list. This allows the user to select his favorite character suitably as an NPC and enjoy a game in which the NPC plays a match.

The game device 1 adjusts the degree of change in the character data 11b depending on whether NPCs based on a plurality of FIG. 5 are included in characters which have joined a match game or not. For example, the game device 1 increases the amount of an awarded experience value when an NPC based on another FIG. 5 joins a match game. The game device 1 adjusts the degree of change in the character data 11b depending on the number of characters which have joined a match game. For example, the game device 1 increases the experience value by 1.1 times when three characters have played a match, or increases the experience value by 1.2 times when four characters have played a match. The game device 1 adjusts the degree of change in the character data 11b depending on the content of game processing. For example, the game device 1 calculates an experience value to be awarded to an NPC on the basis of victory or defeat in a game, ranking, damage to other characters, the probability of succession of attacking, or the like. This makes it possible to adjust the degree of change in the experience value depending on the situation or the like of a played game, and enhance the amusement of a game.

The game device 1 writes the character data 11b including the device ID 11a in the FIG. 5 so as to correlate the game device 1 with the FIG. 5. The game device 1 determines whether the FIG. 5 is correlated with the game device 1 itself or not depending on whether the device ID 11a included in the character data 53b acquired from the FIG. 5 through near field communication accords with a device ID of the game device 1 itself or not. The game device 1 adjusts the degree of change in the character data 11b depending on the determination result. For example, the game device 1 increases the experience value to be awarded to an NPC based on a FIG. 5 by 1.2 times when the FIG. 5 is not correlated with the game device 1 itself. This can prompt the user owing the FIG. 5 to play a game with a game device 1 owned by another user.

The game device 1 performs processing to award an item to an NPC depending on the game record or the like of a match game. The game device 1 may adjust the probability of awarding an item, the number of awarded items, or the like depending on whether a PC is included in opponents of the NPC or not, the number of characters which have joined a match game, or the like, for example. This makes it possible to award an item suitably to an NPC which has joined a game, and enhance the amusement of a game. The game device 1 may adjust the probability of awarding an item, the number of awarded items, or the like depending on whether the FIG. 5 is correlated with the game device 1 itself or not. For example, the game device 1 may be constructed to always award an item to an NPC based on a figure when the FIG. 5 is not correlated with the game device 1 itself.

This makes it possible to award an item as a gift to a character related to a FIG. 5 owned by a user who has played a game with a game device 1 owned by another user.

Although the game device 1 in this embodiment is constructed to award an experience value, an item and the like only to an NPC related to a FIG. 5, it is to be noted that the present invention is not limited to this. The game device 1 may also award an experience value, an item and the like to a PC or an NPC selected from characters listed in the character selection screen. The condition to be used for adjusting the amount of an awarded experience value explained in this embodiment is exemplary and not restrictive. Similarly, the condition to be used for adjusting the probability of awarding an item or the quantity of awarded items is exemplary and not restrictive. For example, although an example is illustrated in this embodiment wherein the experience value to be awarded to an NPC and the probability of awarding an item or the quantity of awarded items are increased when a game is played with another game device 1 which is not correlated with the FIG. 5, the present invention is not limited to this. The experience value to be awarded to an NPC and the probability of awarding an item or the quantity of awarded items may be increased when a game is played with a game device 1 correlated with the FIG. 5. Although this embodiment has been explained using an example of a game wherein a PC operated by the user and/or an NPC, which is not operated by the user, takes actions such as offense and defense and play a match, the content of a game is exemplary and not restrictive. The screen illustrated in FIGS. 1, 8, 9 and 12 are exemplary and not restrictive.

Although this embodiment has been explained using an example of a game device 1 of portable type, the present invention is not limited to this. For example, a similar technology can be applied to various information processing devices such as a game machine of stationary type, a general purpose computer, a terminal device of tablet type or a portable telephone, for example. In the case of a game machine of stationary type, the NFC unit 16 may be included not in a body portion but in a controller of portable type or the like. In the case of a device such as a general purpose computer which does not include the NFC unit 16, the device may be connected wiredly or wirelessly with another device for performing near field communication.

Although each FIG. 5 is used as a specific data storage medium corresponding to the game program 91, the present invention is not limited to this, and an IC card or the like may be used, or another medium may be used. Although the game device 1 is constructed to perform near field communication according to the NFC standard, the present invention is not limited to this, and the game device 1 may be constructed to perform near field communication according to another communication standard. A part or whole of processing by the processing unit 10 of the game device 1 may be performed by another device such as a server device, for example, or a plurality of devices may be constructed to realize processing in cooperation.

Although the processing unit 10 of the game machine 1 executes the game program 91 so that units from the game processing unit 21 to the award processing unit 26 are provided in the processing unit 10 as software functional blocks, the present invention is not limited to this. A part of functions of units from the game processing unit 21 to the award processing unit 26 may be provided as an OS (Operating System) function, for example, or may be provided as hardware functional blocks.

(Variation)

An information processing system according to a variation has a configuration wherein a FIG. 5 utilized in the aforementioned match game can be utilized in another game. The another game can be a role-playing game, for example. In a role-playing game according to a variation, a PC operated by the user at the operating unit 14 and an NPC related to a FIG. 5 fight against an enemy in cooperation. Actions of an NPC in a role-playing game are controlled by the processing unit 10 of the game device 1.

An IC tag 50 of a FIG. 5 according to a variation stores character data 53b for a match game, and character data (illustration is omitted) for a role-playing game in a storage unit 53. Therefore, identification information indicating for which game the data is to be used, e.g., a game ID or the like, is attached respectively to both character data. The game device 1 reads out character data, to which a game ID corresponding to a game program executed by the processing unit 10 is attached, from the FIG. 5 and uses the character data.

This makes it possible to utilize one FIG. 5 for a plurality of games in an information processing system according to a variation, and therefore a FIG. 5 can be used more effectively. Although this variation has a configuration wherein character data is stored in the storage unit 53 of the FIG. 5 for each game, it is to be noted that the present invention is not limited to this. Character data 53b may be shared by a plurality of games. This can reflect growth or the like of an NPC in one game on another game, and enhance the amusement of a game. Utilization of the FIG. 5 is not limited to a game, and the FIG. 5 can be utilized in various other applications.

When used in the present specification, each element or the like denoted in a singular form with a word "a" or "an" attached in front thereof is to be understood not to eliminate the probability of a plurality of elements related thereto.

The present technology is expected to enhance the amusement of information processing, which utilizes a data storage medium, by controlling a character corresponding to data acquired from a data storage medium as a non player character.

What is claimed is:

1. A non-transitory recording medium in which an information processing program is recorded, the information processing program configuring a computer system to operate as:

a near field wireless transceiver performing near field communication with a data storage medium having a near field communication function and acquiring character data stored in the data storage medium;

an information processor performing information processing to control a character corresponding to the character data, which has been acquired by the near field wireless transceiver, as a non player character;

a data writer that changes the character data depending on a processing result of the information processor;

the information processing program further configuring the computer system to operate as a selector that accepts selection of a non player character, the selector selecting a character corresponding to character data, which has been acquired by the near field wireless transceiver, as a non player character;

the information processing program further configuring the computer system to operate as a display processor performing processing to display a plurality of characters as selection objects at a display, and the selector accepting selection from the plurality of characters displayed by the display processor, or selection of a non player character on the basis of near field communication with the data storage medium.

2. The recording medium according to claim 1, wherein the information processing program further configures the computer to operate as a data updater storing the character data, which has been changed by the data writer, in the data storage medium through near field communication and updating the character data.

3. The recording medium according to claim 2, wherein
the information processor performs information processing depending on a plurality of character data, which have been acquired from a plurality of data storage mediums by the near field wireless transceiver,
the data writer changes the plurality of character data depending on a processing result of the information processor, and
the data updater stores the plurality of character data, which have been changed by the data writer, respectively in corresponding data storage mediums and updates the plurality of character data.

4. The recording medium according to claim 1, wherein
the selector selects a plurality of characters corresponding to a plurality of character data, which have been acquired from a plurality of data storage mediums by the near field wireless transceiver, as a plurality of non player characters, and
the information processor controls the plurality of non player characters, which have been selected by the selector, independently.

5. The recording medium according to claim 1, wherein the data writer adjusts the degree of change in the character data depending on whether a plurality of non player characters based on a plurality of data storage mediums are included in characters selected by the selector or not.

6. The recording medium according to claim 1, wherein the data writer adjusts the degree of change in the character data depending on the number of characters selected by the selector.

7. The recording medium according to claim 1, wherein the data writer adjusts the degree of change in the character data depending on the content of information processing by the information processor.

8. The recording medium according to claim 1, wherein
the information processing program further configures the computer system to operate as:
a correlator performing processing to correlate the computer system with the data storage medium; and
a determiner that determines whether the data storage medium, from which the near field wireless transceiver has acquired the character data, is correlated with the computer system of the determiner itself or not, and
the data writer adjusting the degree of change in the character data depending on a determination result of the determiner.

9. The recording medium according to claim 8, wherein the information processing program further configures the computer system to operate as an award processor performing processing to award an item to a non player character related to the character data depending on a determination result of the determiner.

10. The recording medium according to claim 8, wherein the information processing program further configures the computer system to operate as an award processor performing processing to award an item to a non player character depending on a processing result of the information processor.

11. The recording medium according to claim 9, wherein
the information processing program further configures the computer system to operate as a data updater storing the character data, which has been changed by the data writer, in the data storage medium through near field communication and updating the character data, and
the data updater stores information related to an item, which has been awarded by the award processor, in the data storage medium.

12. The recording medium according to claim 10, wherein
the information processing program further configures the computer system to operate as a data updater storing the character data, which has been changed by the data writer, in the data storage medium through near field communication and updating the character data, and
the data updater stores information related to an item, which has been awarded by the award processor, in the data storage medium.

13. An information processing system comprising:
a data storage medium having a near field communication function; and
an information processing device having:
a wireless receiver performing near field communication with the data storage medium and acquiring character data stored in the data storage medium;
an information processor performing information processing to control a character corresponding to the character data, which has been acquired by the wireless receiver, as a non player character;
a data writer changing the character data depending on a processing result of the information processor;
the information processor operating as a selector accepting selection of a non player character,
the selector selecting a character corresponding to character data, which has been acquired by the wireless receiver, as a non player character;
the information processor further operating as a display processor performing processing to display a plurality of characters as selection objects at a display, and
the selector accepting selection from the plurality of characters displayed by the display processor, or selection of a non player character on the basis of near field communication with the data storage medium.

14. The information processing system according to claim 13, wherein the data storage medium is a figure imitating the non player character.

15. The information processing system according to claim 13, wherein
the information processor executes a program to be used for information processing, and
the data storage medium can be utilized for a plurality of applications to be realized by a plurality of programs executed by the information processor.

16. The information processing system according to claim 15, wherein the data storage medium is capable of storing data related to the plurality of applications.

17. An information processing device comprising:
a wireless receiver performing near field communication with a data storage medium having a near field communication function and acquiring character data stored in the data storage medium;
an information processor performing information processing to control a character corresponding to the character data, which has been acquired by the wireless receiver, as a non player character;

a data writer changing the character data depending on a processing result of the information processor;

the information processor operating as a selector accepting selection of a non player character, the selector selecting a character corresponding to character data, which has been acquired by the wireless transceiver, as a non player character;

the information processor operating as a display processor performing processing to display a plurality of characters as selection objects at a display, and the selector accepting selection from the plurality of characters displayed by the display processor, or selection of a non player character on the basis of near field communication with the data storage medium.

18. An information processing method comprising:

performing near field communication with a data storage medium having a near field communication function and acquiring character data stored in the data storage medium;

performing information processing to control a character corresponding to the acquired character data as a non player character;

changing the character data depending on a processing result of the information processing;

accepting selection of a non player character, selecting a character corresponding to character data, which has been acquired, as a non player character;

performing processing to display a plurality of characters as selection objects at a display, and accepting selection from the plurality of characters displayed at the display, or selection of a non player character on the basis of near field communication with the data storage medium.

* * * * *